(12) United States Patent
Abrahamsen et al.

(10) Patent No.: US 8,248,760 B2
(45) Date of Patent: Aug. 21, 2012

(54) SWITCH ARRANGEMENT FOR AN ELECTRICAL SWITCHGEAR

(75) Inventors: Michael H. Abrahamsen, Greenwood, SC (US); Jon C. Beaver, Greenwood, SC (US); Robert Yanniello, Asheville, NC (US)

(73) Assignee: Eaton Corporation, Cleveland, OH (US)

( * ) Notice: Subject to any disclaimer, the term of this patent is extended or adjusted under 35 U.S.C. 154(b) by 138 days.

(21) Appl. No.: 12/831,519

(22) Filed: Jul. 7, 2010

(65) Prior Publication Data

US 2012/0008256 A1    Jan. 12, 2012

(51) Int. Cl.
*H02B 1/20* (2006.01)
*H02B 5/00* (2006.01)
*H01H 9/00* (2006.01)
*H01R 13/73* (2006.01)

(52) U.S. Cl. ........ 361/611; 361/605; 361/608; 361/624; 200/50.27; 200/50.21; 439/546

(58) Field of Classification Search .................. 361/611, 361/605, 608, 624; 200/50.21, 50.27; 439/546
See application file for complete search history.

(56) References Cited

U.S. PATENT DOCUMENTS

| | | | | |
|---|---|---|---|---|
| 3,899,722 A * | 8/1975 | Cadez et al. | ................. | 361/606 |
| 4,202,028 A * | 5/1980 | Baird | ............................ | 361/615 |
| 4,644,442 A * | 2/1987 | Ponsioen et al. | ............. | 361/612 |
| 4,827,088 A * | 5/1989 | Oakes et al. | ..................... | 200/18 |
| 4,880,947 A * | 11/1989 | Fey et al. | ....................... | 218/118 |
| 5,245,506 A * | 9/1993 | Tanimizu | ...................... | 361/605 |
| 5,510,592 A * | 4/1996 | Gentsch et al. | ............... | 218/134 |
| 5,777,287 A * | 7/1998 | Mayo | ............................. | 218/123 |
| 5,793,008 A * | 8/1998 | Mayo et al. | .................... | 218/129 |
| 6,025,983 A * | 2/2000 | Uchida et al. | ................. | 361/606 |
| 6,163,002 A * | 12/2000 | Ahn et al. | ..................... | 218/123 |
| 6,865,072 B2 * | 3/2005 | Sato et al. | ...................... | 361/619 |
| 7,906,742 B2 * | 3/2011 | Steffens et al. | ............... | 218/126 |
| 8,110,771 B2 * | 2/2012 | Takahashi et al. | ............ | 218/136 |
| 2002/0012226 A1* | 1/2002 | Arioka et al. | ................. | 361/618 |
| 2002/0043514 A1* | 4/2002 | Kim, II | ......................... | 218/118 |
| 2002/0043516 A1* | 4/2002 | Morita et al. | ................. | 218/118 |

(Continued)

FOREIGN PATENT DOCUMENTS

DE      19 34 803 A1    8/1970

(Continued)

OTHER PUBLICATIONS

The European Patent Office, "extended European search report", Mar. 8, 2012, 5 pp.

*Primary Examiner* — Bradley Thomas
(74) *Attorney, Agent, or Firm* — Eckert Seamanss Cherin & Mellott, LLC; Kirk D. Houser

(57) ABSTRACT

A switch arrangement for an electrical switchgear comprising a first bus, a second bus and a load connection. The switch arrangement comprises a breaker; wherein said breaker is moveable in said switchgear between a first position and a second position, such that in use, when said breaker is in said first position and closed it electrically connects said first bus to said load connection, and when said breaker is in said second position and closed it electrically connects said second electrical bus to said load connection, with said first electrical bus disconnected from said load connection.

2 Claims, 8 Drawing Sheets

U.S. PATENT DOCUMENTS

| | | | |
|---|---|---|---|
| 2003/0117769 A1* | 6/2003 | Yamane et al. | 361/612 |
| 2004/0121657 A1* | 6/2004 | Muench et al. | 439/723 |
| 2004/0141271 A1* | 7/2004 | Kikuchi et al. | 361/62 |
| 2004/0164053 A1* | 8/2004 | Stoving et al. | 218/118 |
| 2005/0201028 A1* | 9/2005 | Inami et al. | 361/62 |
| 2007/0108164 A1* | 5/2007 | Muench et al. | 218/118 |
| 2007/0138143 A1* | 6/2007 | Muench et al. | 218/1 |
| 2007/0175866 A1* | 8/2007 | Tsuchiya et al. | 218/10 |
| 2007/0241080 A1* | 10/2007 | Stoving et al. | 218/118 |
| 2007/0261946 A1* | 11/2007 | Yu | 200/48 R |
| 2007/0293073 A1* | 12/2007 | Hughes et al. | 439/187 |
| 2008/0001688 A1* | 1/2008 | Gottschalk | 335/172 |
| 2008/0067152 A1* | 3/2008 | Kikukawa et al. | 218/139 |
| 2009/0020507 A1* | 1/2009 | Kurogi et al. | 218/119 |
| 2009/0119899 A1* | 5/2009 | Muench et al. | 29/428 |
| 2009/0141430 A1* | 6/2009 | Jung et al. | 361/612 |
| 2009/0159568 A1* | 6/2009 | Ozawa et al. | 218/140 |
| 2009/0237869 A1* | 9/2009 | Kikukawa et al. | 361/612 |
| 2009/0266695 A1* | 10/2009 | Bickel et al. | 200/48 R |
| 2009/0296320 A1* | 12/2009 | Fink et al. | 361/612 |
| 2009/0316339 A1* | 12/2009 | Jung | 361/612 |
| 2010/0025375 A1* | 2/2010 | Bodenstein et al. | 218/118 |
| 2010/0122967 A1* | 5/2010 | Morita et al. | 218/140 |
| 2010/0159725 A1* | 6/2010 | Hughes et al. | 439/181 |
| 2010/0170874 A1* | 7/2010 | Tsuchiya et al. | 218/118 |
| 2010/0195273 A1* | 8/2010 | Kikukawa et al. | 361/612 |
| 2011/0058311 A1* | 3/2011 | Kikukawa et al. | 361/611 |
| 2011/0081793 A1* | 4/2011 | Hughes et al. | 439/181 |
| 2011/0155698 A1* | 6/2011 | Trussler et al. | 218/154 |
| 2012/0006661 A1* | 1/2012 | Abrahamsen et al. | 200/238 |

FOREIGN PATENT DOCUMENTS

| | | |
|---|---|---|
| FR | 2 157 718 A1 | 6/1973 |
| GB | 1 139 594 A | 1/1969 |

* cited by examiner

SWITCH ARRANGEMENT FOR AN ELECTRICAL SWITCHGEAR

BACKGROUND

1. Field

The disclosed concept relates to a switch arrangement for electrical switchgear.

2. Background Information

As is well known, switchgear is an integrated assembly of switches, circuit breakers, buses (i.e. power supply rails), fuses and other components used to isolate electrical equipment at an electrical installation, for example, an electrical power substation. Switchgear is used to both de-energise equipment to allow work to be done and to clear faults downstream of the switchgear. Switchgear is often housed in a metal cabinet at the installation.

In known installations, a distinction is made between so called 'fixed switchgear' and so called 'withdrawable switchgear'. In fixed switchgear the main switching/protective device, for example a circuit breaker, is fastened within the installation by fasteners, for example bolts, and cannot be removed from the installation without using tools to undo the fasteners. In withdrawable switchgear, additional constructional features enable the main switching/protective device to be withdrawn from the installation (and put back in) with a minimum usage of tools or with no usage of tools. Accordingly, in withdrawable switchgear, the main circuit breaker, for example, can be removed quickly for maintenance or replacement or to provide easy access to other components in the installation.

So called double busbar switchgear comprises a first busbar connected to a first power source, a second busbar connected to a second power source and a switching arrangement by means of which an operator can select to connect either the first busbar or the second busbar to a load connection to supply power to a load. In double busbar switchgear, in use, one of the first and second busbars is connected to the load connection and the other is disconnected from the load connection. Accordingly, the connected busbar is the means by which power is supplied to the load and the disconnected busbar is redundant but acts as a reserve. If there is a problem with the power supply from the connected bus bar, or the connected bus bar requires maintenance, the switching arrangement is used to disconnect that busbar from the load connection and to connect the other busbar to the load connection instead. In this way, there is little interruption of the power supplied to the load. Double busbar switchgear also allows for more easily balancing loads between the two sources.

Typically, in known arrangements, the switching arrangement comprises a selector switch for selecting to connect either the first busbar or the second busbar to the load connection and a separate circuit breaker, which is connected between the selector switch and the load connection. In order to switch the load connection from one busbar to the other, an operator must first open the circuit breaker, use the selector switch to disconnect the currently connected busbar from the load connection and connect the other busbar to the load connection instead, and then close the circuit breaker.

It is desirable to provide an improved switching arrangement for an electrical double busbar switchgear and in particular a switching arrangement with less components and that is preferably compact and space efficient.

SUMMARY

According to the disclosed concept, there is provided a switch arrangement for electrical switchgear comprising a first bus, a second bus and a load connection, said switch arrangement comprising: a switching element; wherein said switching element is moveable in said switchgear between a first position and a second position, such that in use, when said switching element is in said first position and closed it electrically connects said first bus to said load connection, and when said switching element is in said second position and closed it electrically connects said second electrical bus to said load connection, with said first electrical bus disconnected from said load connection.

Advantageously, with such an arrangement, there is no need for a separate selector switch for selecting to connect said first bus or said second bus to a load.

Preferably, said switching element moves substantially linearly between the first and second positions. This linear movement enables the switch arrangement to be made relatively compact.

Preferably, the switch arrangement, further comprises, a terminal assembly comprising a first electrical contact for said first bus, a second electrical contact for said load connection and a third electrical contact for said second bus, said contacts arranged together along a common axis and wherein said switching element moves along said common axis between said first position and said second position; wherein, when said switching element is in said first position and closed it connects said first electrical contact for said first bus to said second electrical contact for said load connection and when said switching element is in said second position and closed it connects said third electrical contact for said second bus to said second electrical contact for said load connection.

This arrangement enables an operator to switch between either the first bus or the second bus being connected to a load, in a quick and straightforward manner.

BRIEF DESCRIPTION OF THE DRAWINGS

The disclosed concept will be described in more detail below, with reference to the accompanying drawings, in which.

DESCRIPTION OF THE PREFERRED EMBODIMENTS

Figure 1A:
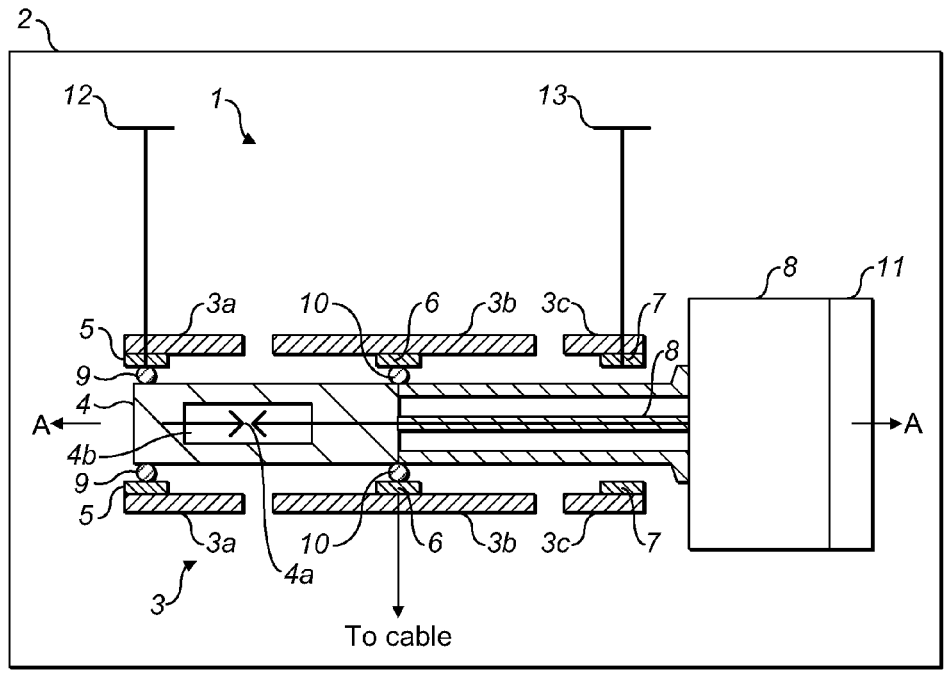
FIG. 1a is a schematic illustration of a side sectional view of a switch arrangement with a circuit breaker switching element in a first position.
Figure 1B:
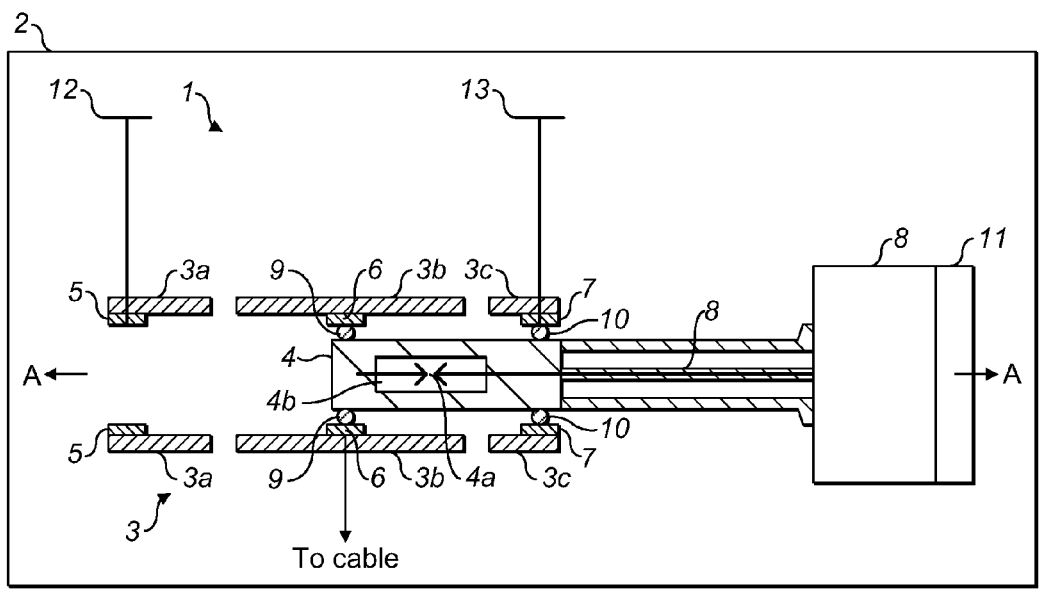
FIG. 1b is a schematic illustration of a side sectional view of the switch arrangement with the circuit breaker switching element in a second position.
Figure 1C:
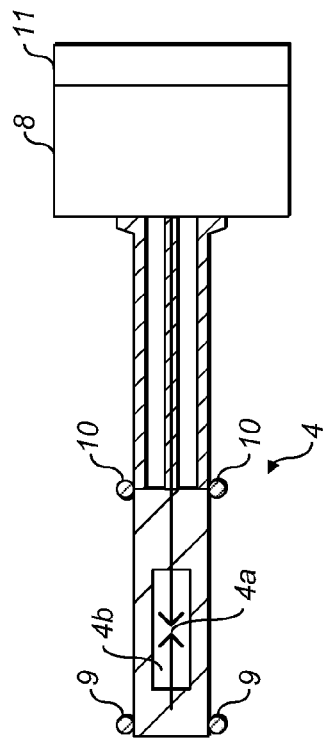
FIG. 1c is a schematic illustration of a sectional view of the switch arrangement with the circuit breaker switching element in a third position.
Figure 1C:
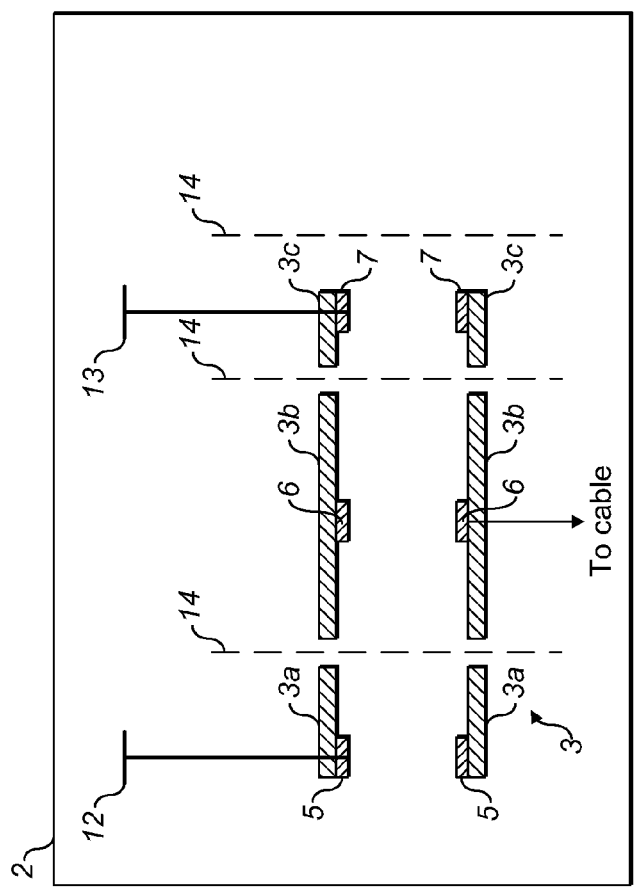

Referring to FIGS. 1a to 1c, a switch arrangement 1 for an electrical switchgear 2 comprises an electrical pole or terminal 3 and a circuit breaker switching element 4. The terminal 3, is fixed within the switchgear 2 and comprises a housing made up of first 3a, second 3b and third 3c electrically insulating tubular sections of substantially equal internal diameter which are spaced apart lengthwise along a common axis A. The three tubular sections may for example be formed of an epoxy resin material. Each of the three tubular sections 3a, 3b and 3c has a respective electrical contact 5, 6, 7 located inside of it. The first section 3a has a first bus bar contact 5 in electrical connection with a first electrical bus 12 of the switchgear 2, the second section 3b has a cable contact 6 in electrical connection with a cable (not shown) of the switch gear 2 and hence to a load (not shown) and the third section 3c comprises a second bus bar contact 7 in electrical connection with a second electrical bus 13 of the switchgear 2. In this example, the conductive contacts 5, 6, 7 are formed of metal, preferably copper, are ring shaped and arranged around the respective inner surfaces of the first 3a, second 3b and third 3c insulating sections.

The circuit breaker switching element 4, which may utilize a vacuum interrupter, is preferably generally cylindrical in shape, and is arranged lengthwise along the axis A and is moveable in and out of the inside of the terminal 3. If the breaker switching element 4 utilizes a vacuum interrupter, as is standard with such devices, it comprises two internal electrical contacts 4a, enclosed in a vacuum chamber 4b, one fixed and the other moveable and a breaker actuator assembly 8 is provided for moving the moveable contact away from the fixed contact to switch load or open (i.e. trip) the breaker switching element 4 in the event of a fault (e.g. an over current) being detected. The breaker switching element 4 may of course utilize other types of interrupter, for example, a SF6 gas interrupter.

In this embodiment, the circuit breaker switching element 4 further comprises at its respective ends, first 9 and second 10 external electrical contacts, each of which is preferably a ring shaped metal (e.g. copper) coil located in a respective annular groove (not shown) that extends around an external diameter of the breaker switching element 4, although different arrangements of contacts are also possible, for example, pad shaped contacts.

The switch arrangement 1 further comprises a powered drive mechanism 11 for causing linear movement of the circuit breaker switching element 4, in the terminal 3, between a first position illustrated in FIG. 1a and a second position shown in FIG. 1b.

Figure 2D:
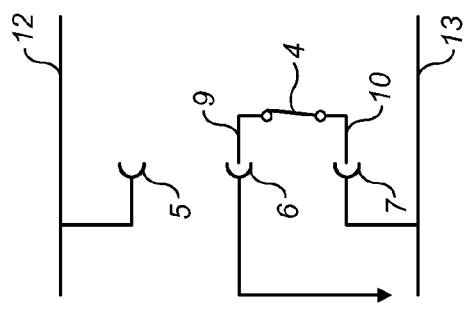
FIGS. 2a to 2d are circuit diagrams of the switch arrangement in various switch configurations.
Figure 2C:
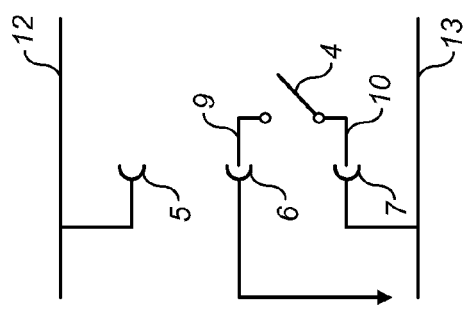
Figure 2B:
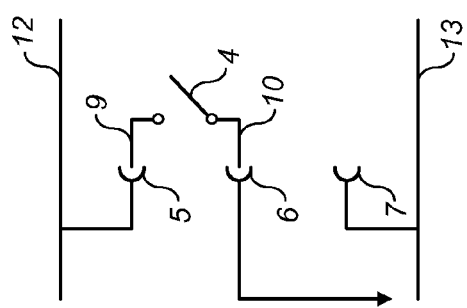
Figure 2A:
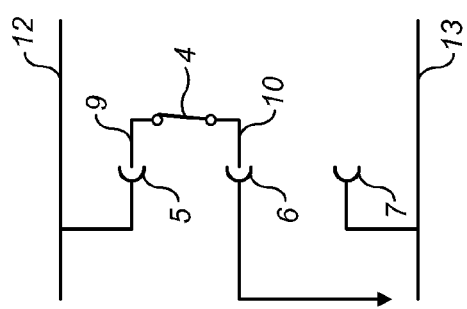

In the first position, the first contact 9 slideably engages the first bus-bar contact 5 and the second contact 10 slideably engages the cable contact 6. Accordingly, as illustrated in the circuit diagram of FIG. 2a, when the circuit breaker switching element 4 is in the first position and is closed (i.e. the internal contacts 4a are closed) the first busbar 12 is electrically connected via the breaker switching element 4 to the cable contact 6 so that the switch gear arrangement 1 can supply power to a load (not shown) via the first busbar 12. As illustrated in FIG. 2b, when the circuit breaker switching element 4 is in the first position but is open (i.e. the internal contacts 4a are open), for example, because of a fault condition, the first bus-bar 12 is electrically disconnected from the cable contact 6 and the switch gear arrangement 1 does not supply power to the load (not shown).

In the second position, the first contact 9 slideably engages the cable contact 6 and the second contact 10 slideable engages the second busbar contact 7. Accordingly, as illustrated in the circuit diagram of FIG. 2c, when the circuit breaker switching element 4 is in the second position and is open, the cable contact 6 is electrically disconnected from the second busbar 13 by the open breaker switching element 4. As illustrated in FIG. 2d, when the circuit breaker switching element 4 is in the second position but is closed, the cable contact 6 is electrically connected to the second busbar 13 via the circuit breaker switching element 4 so that the switch gear arrangement 1 can supply power to the load (not shown) via the second busbar 13.

Advantageously, this arrangement enables either the first bus bar 12 or the second bus bar 13 to be easily selectively connected to a load (not shown), by means of the moveable breaker switching element 4, negating the requirement of a separate selector switch.

FIG. 1c illustrates the circuit breaker switching element 4 in a third position in which it is withdrawn from the switch gear arrangement 1. The circuit breaker switching element 4 may be driven between this position and the second position along the axis A by the drive mechanism 11. Alternatively, the circuit breaker switching element 4 and the drive mechanism 11 may be constructed as an integrated unit, which a human operator can manipulate manually between the second and third positions or can be power driven between the second and third positions.

Optionally, as illustrated in FIG. 1c, three shutters 14 are provided, one of which can be drawn into the space between the first section 3a and the second section 3b, another of which can be drawn into the space between the second section 3b and the third section 3c and the last of which can be drawn in front of the opening of the third section 3c position shown in FIG. 1c. Accordingly, the shutters 14 may be drawn when the breaker is removed from the housing 3, to act as physical barriers to the contacts 5, 6 and 7.

The housing 3 may be transparent to allow for easy visible inspection of components.

Figure 3:
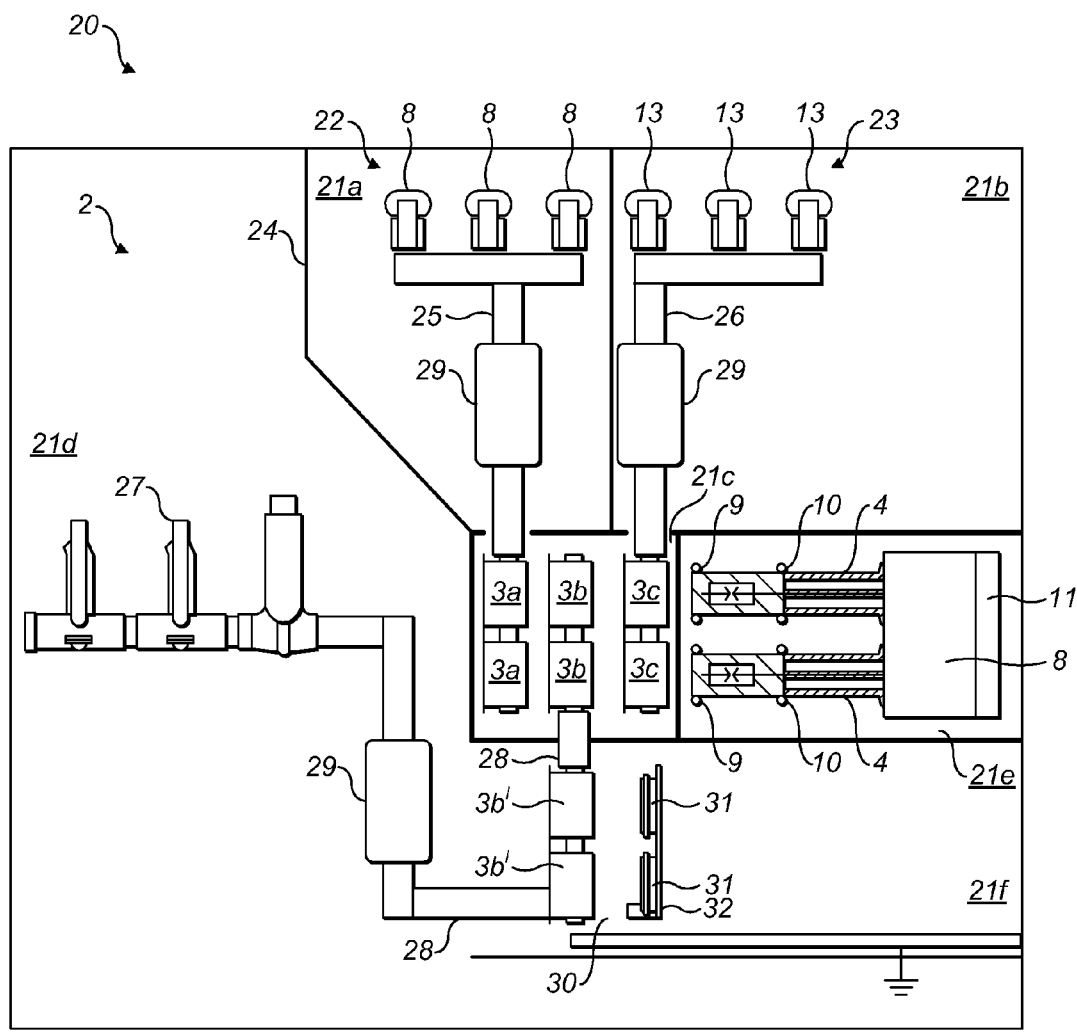
FIG. 3 is a schematic side view of the inside of an electrical switchgear comprising a switch arrangement comprising a three phase circuit breaker with circuit breaker switching elements shown in the third position.
Figure 4:
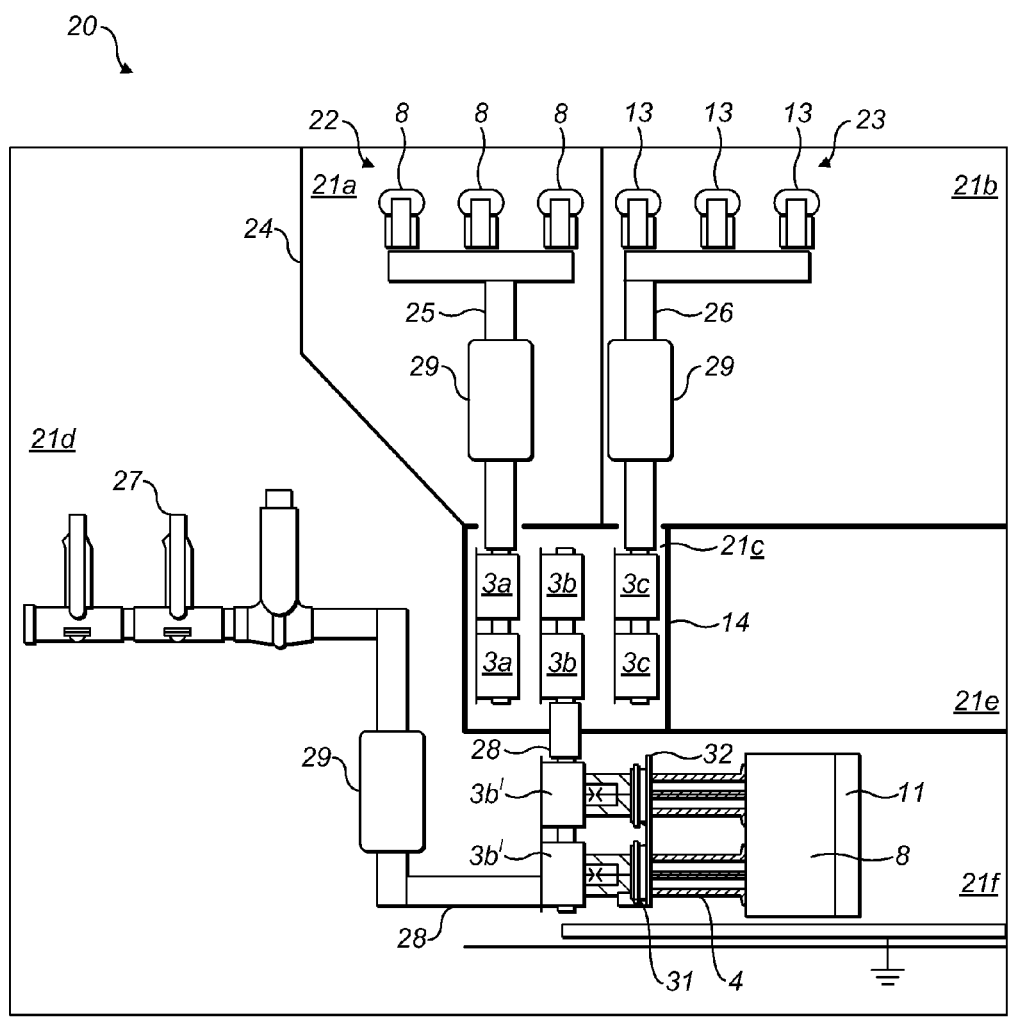
FIG. 4 is a schematic side view of the inside of the electrical switchgear comprising a switch arrangement comprising a three phase circuit breaker with circuit breaker switching elements shown in an earthing position.
Figure 5:
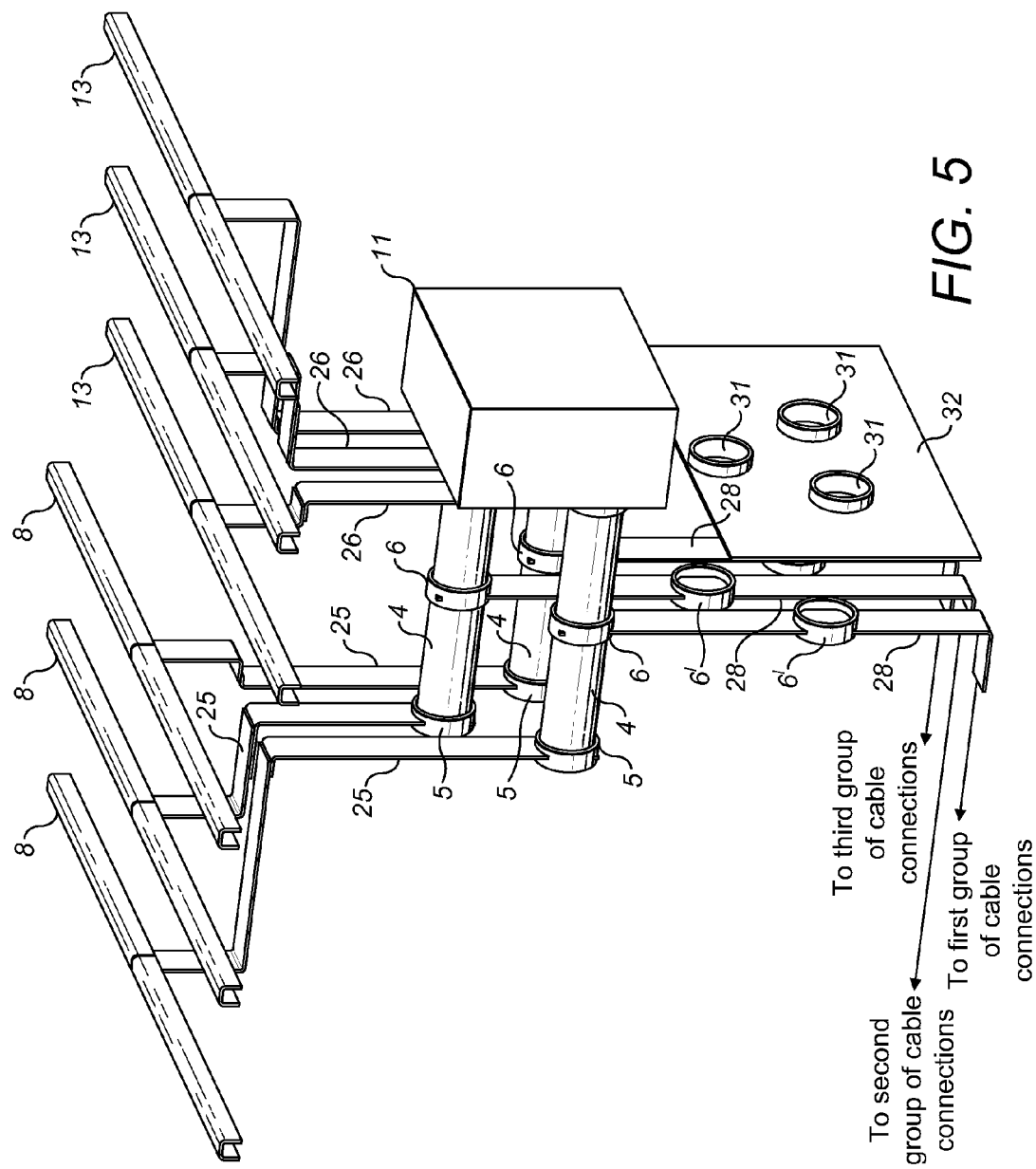
FIG. 5 is a schematic isometric view of the inside of the electrical switchgear comprising the switch arrangement with the circuit breaker switching elements shown in the first position.
Figure 6:
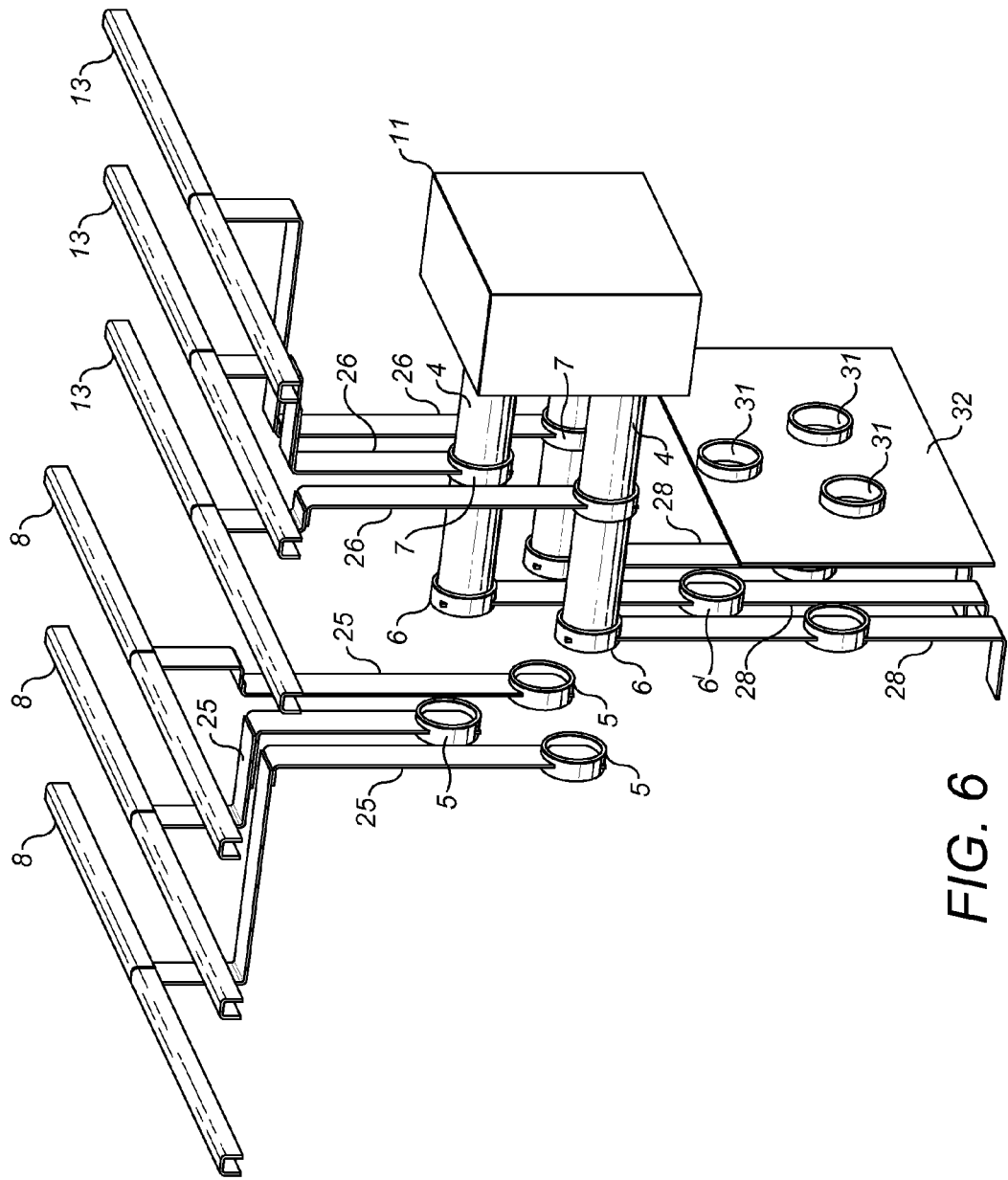
FIG. 6 is a schematic isometric view of the inside of the electrical switchgear comprising the switch arrangement with the circuit breaker switching elements shown in the second position.
Figure 7:
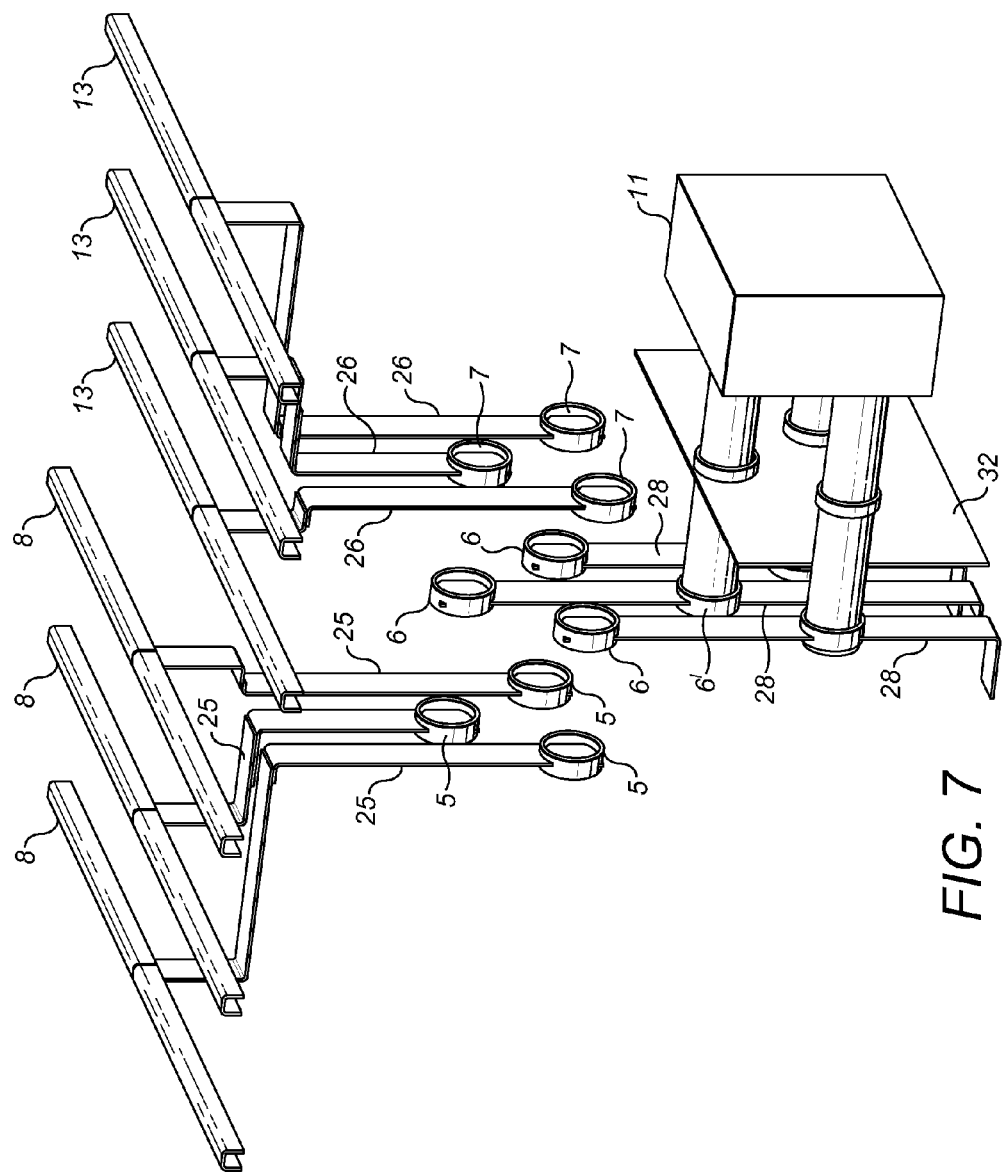
FIG. 7 is a schematic isometric view of the inside of the electrical switchgear comprising the switch arrangement with the circuit breaker switching elements shown in the earthing position.

FIGS. 3 and 4 illustrate side views of the inside of an electrical switchgear cabinet 20, embodying the disclosed concept. FIGS. 5 to 7 illustrate schematic isometric views of the cabinet 20. For reasons of clarity certain of the features illustrated in FIGS. 3 and 4 are omitted from FIGS. 5 to 7. For example, the tubular sections 3a, 3b and 3c are omitted from FIGS. 5 to 7, but the contacts 5, 6 and 7 are shown. Features the same as those already described with respect to FIGS. 1 and 2 are given the same reference numerals in FIGS. 3 to 7 as they are in FIGS. 1 and 2.

The cabinet 20 is divided by internal partitions 24 into a plurality of compartments 21a to 21f containing the internal components of the switchgear 2. The switchgear 2 is double busbar switchgear comprising a first busbar arrangement 22 in an upper middle compartment 21a and a second busbar arrangement 23 in an adjacent upper forward compartment 21b. Each of the first 22 and second 23 busbar arrangements is a three-phase system, the first bus bar arrangement 22 comprising three conductive busbars 8 (i.e. one for each phase) and the second busbar arrangement 23 comprising three conductive busbars 13 (i.e. one for each phase).

The switchgear 2 further comprises three terminals 3, one for each phase, (only two are visible in the views of FIGS. 3 and 4), of the type illustrated in FIGS. 1a to 1c, contained in a middle compartment 21c and a three pole breaker device comprising three circuit breaker switching elements 4, one for each phase, each of the type illustrated in FIGS. 1a to 1c, and associated with a respective one of the three terminals 3. The three pole breaker device comprises a breaker actuator assembly 8 for opening/closing the breaker switching elements 4 in unison, for example, for opening (i.e. tripping) the breaker switching elements 4 in unison if a fault is detected. If the breaker switching elements 4 are vacuum or SF6 interrupters the beaker actuator assembly 8 will move the moveable stems of the interrupters to open/close the breakers.

Each of the busbars 8 is connected to a respective one of three conductors 25, which is routed to the first bus bar contact 5 of a respective one of the terminals 3a. Similarly, each of the busbars 13 is connected to a respective one of three conductors 26, which is routed to the second bus bar contact 7 of a respective one of the terminals 3c.

A rear compartment 21d contains three groups of three cable terminations 27 (only one group of the three is visible in FIGS. 3 and 4 and they are omitted from FIGS. 5 to 7) which are connectable to cables (not shown) routed to a load (not shown). Each group of three cable terminations 27 is connected to a respective one of three conductors 28, each of which is routed to a cable contact 6 of a respective one of the terminals 3. Each conductor 25, 26, 28 may be fitted with measuring equipment 29, for example, a current transformer, voltage transformer or other such device. Although in the illustrated embodiment the cable terminations 27 are upwards facing, which is convenient for connecting to cables routed downwards from the top of the cabinet 20, they could just as well be downwards facing, which is convenient for connecting to cables routed downwards from the bottom of the cabinet 20.

A drive mechanism 11 for driving the circuit breaker switching elements 4 between the first position illustrated in FIG. 5 (and FIG. 1a) and the second position illustrated in FIG. 6 (and FIG. 2b) is contained in a middle forward compartment 21e. In this embodiment, the drive mechanism 11 comprises a power driven carrier unit mounted on a rail system (not shown) which supports the three pole breaker device, and is driven back and forth on the rail system to move the breaker switching elements 4, in unison, between the first and second positions. As explained above, the movement of the breakers 4 is substantially linear. In this embodiment, the breaker actuator assembly 8 and the drive mechanism 11 are contained in a common housing and form an integrated unit. Alternatively, the drive mechanism 11 may be housed within the switchgear separately from the breaker actuator assembly 8.

In the first position (see FIG. 5), when the breaker switching elements 4 are closed, each bus bar 8 is connected to a respective one of the three groups of cable termination 27 via a conductor 25, a first bus bar contact 5, a breaker switching element 4, a cable contact 6 and a conductor 28. The bus bars 13 are isolated from the cable terminations 27 in the first position. In the second position (See FIG. 6), when the breaker switching elements 4 are closed, each bus bar 13 is connected to a respective one of the three groups of cable termination 27 via a conductor 26, a second bus bar contact 7, a breaker switching element 4, a cable contact 6 and a conductor 28. The bus bars 8 are isolated from the cable terminations 27 in the second position.

The switchgear 2 further comprises a cable connection earthing arrangement 30 in a lower forward compartment 21f. The cable connection earthing arrangement 30 comprises three terminals each comprising a tubular insulating section 3b' that is substantially the same as the second section 3b of the terminals 3, containing a cable contact 6' that is substantially the same as the cable contacts 6. Each cable contact 6' is electrically connected by a respective one of the conductors 28 to a cable contact 6 above it and to a respective one of the three groups of cable termination 27. Each terminal further comprises a ring shaped earth contact 31 fitted through a respective one of three apertures formed in a conductive ground plane sheet 32. Each earth contact 31 is in circumferential contact with the ground plane 32 and is directly below (although not in electrical contact with) a respective one of the three second bus bar contacts 7.

The breaker switching elements 4, the breaker actuator 8 and, in this embodiment, the drive mechanism 11 form an integrated unit which can be easily removed from the middle forward compartment 21e by an operator and placed in a fourth position in the compartment 21f as illustrated in FIG. 4. In this fourth position, when the breaker switching elements 4 are closed, each group of three cable connections 27 is connected to earth via a conductor 28, a cable contact 6', a breaker 4 switching element, an earth contact 31 and the ground plane sheet 32 which is earthed via a ground bar in cabinet 20.

As is best appreciated from FIGS. 5 to 7, the terminals 3 are arranged in parallel within the cabinet 20 in a triangular configuration, with the breaker switching elements 4 correspondingly arranged. This provides for a more compact arrangement than could be achieved by arranging the terminals 3 (and breaker switching elements 4) in parallel and horizontally, in parallel and vertically or in parallel and diagonally.

The embodiments of the disclosed concept described above provide for switchgear in which a breaker can quickly and easily be moved between a first position in which the breaker connects a first bus bar to a load and a second position in which the breaker connects a second bus bar to load. The breaker may also easily be moved to a third position in which it is withdrawn from the switchgear.

It will be appreciated that the disclosed concept may be embodied in rear accessible switchgear, in which access to the load connections is gained by removing a rear panel of the switchgear cabinet, or in front accessible switchgear, in which access to the load connections is gained by removing a front panel of the cabinet.

Many modifications or variations may be made to the described embodiments. For example, although the described terminal housing is in three distinct separate sections, it may instead be a single unitary housing with the contacts 5, 6, 7 being spaced apart along its length and electrically isolated from each other. Alternatively, the housing may comprise two distinct sections with one of the contacts, say the bus bar contact 5, in one section, and the other two contacts in the other section.

Although in the described embodiment, the switching element 4 is a circuit breaker, it will be appreciated that other devices that can make or break a circuit when in the first or second positions may be used, for example, a contactor, a load break switch or an isolation switch.

Although the drive mechanism is described as being powered it may be manually operated.

The general shape of the housing and of the breaker switching element may of course vary from that described above.

The disclosed concept has been described in detail in the foregoing specification, and it is believed that various alterations and modifications of the disclosed concept will become apparent to those skilled in the art from a reading and understanding of the specification. It is intended that all such alterations and modifications are included in the disclosed concept, insofar as they come within the scope of the appended claims.

What is claimed is:

1. A switch arrangement for an electrical switchgear comprising a first bus, a second bus and a load connection, said switch arrangement comprising:
 a switching element; wherein said switching element is moveable in said switchgear between a first position and a second position, such that in use, when said switching element is in said first position and closed it electrically connects said first bus to said load connection, and when said switching element is in said second position and closed it electrically connects said second bus to said load connection, with said first bus disconnected from said load connection;
 a terminal assembly comprising a first electrical contact for said first bus, a second electrical contact for said load connection and a third electrical contact for said second bus, said contacts arranged together along a common axis and wherein said switching element moves along said common axis between said first position and said second position; wherein, when said switching element is in said first position and closed it connects said first electrical contact for said first bus to said second electrical contact for said load connection and when said switching element is in said second position and closed it connects said third electrical contact for said second bus to said second electrical contact for said load connection; and
 an earthing terminal comprising a fourth electrical contact for said load connection and a fifth electrical contact for earth, wherein said switching element can be placed into the earthing terminal to connect the fourth electrical contact for said load connection to said fifth electrical contact for earth, wherein said second electrical contact for said load connection is electrically connected to said fourth electrical contact for said load connection, wherein said fifth electrical contact for earth is electrically isolated from said first electrical contact for said first bus and said third electrical contact for said second bus, and wherein said fourth electrical contact and said fifth electrical contact are not arranged along said common axis.

2. The switch arrangement according to claim 1, further comprising a drive mechanism for driving said switching element between said first position and said second position, and for driving said switching element away from said common axis to a third position placed into the earthing terminal to connect the fourth electrical contact for said load connection to said fifth electrical contact for earth.

* * * * *